United States Patent [19]
Miyazaki et al.

[11] Patent Number: 6,108,298
[45] Date of Patent: Aug. 22, 2000

[54] DISC CARTRIDGE

[75] Inventors: Yukio Miyazaki; Masaru Ikebe; Masatoshi Okamura; Akio Momoi, all of Nagano, Japan

[73] Assignee: TDK Corporation, Japan

[21] Appl. No.: 09/059,578

[22] Filed: Apr. 14, 1998

[30] Foreign Application Priority Data

| Apr. 15, 1997 | [JP] | Japan | 9-096859 |
| Sep. 16, 1997 | [JP] | Japan | 9-268262 |
| Dec. 10, 1997 | [JP] | Japan | 9-356369 |

[51] Int. Cl.[7] .................................................. G11B 23/03
[52] U.S. Cl. ........................................ 369/291; 360/133
[58] Field of Search ................................ 369/289, 290, 369/291; 360/132, 133

[56] References Cited

U.S. PATENT DOCUMENTS

| 3,668,658 | 6/1972 | Flores et al. | 340/174.1 C |
| 4,669,078 | 5/1987 | Ogusu | 369/291 |
| 4,911,301 | 3/1990 | Dieffenbach | 206/444 |
| 5,153,801 | 10/1992 | Ikebe et al. | 369/291 |
| 5,526,337 | 6/1996 | Housey et al. | 369/291 |
| 5,537,389 | 7/1996 | Kuwa et al. | 369/291 |
| 5,936,935 | 8/1999 | Hanakawa et al. | 369/291 |

FOREIGN PATENT DOCUMENTS

| 295 00 045 U1 | 8/1995 | Germany . |
| 195 23 078 A1 | 2/1996 | Germany . |
| 57-13668 | 3/1982 | Japan . |
| 59-117768 | 7/1984 | Japan . |
| 62-57182 | 3/1987 | Japan . |
| 63-119084 | 5/1988 | Japan . |
| 64-78478 | 3/1989 | Japan . |
| 5-307859 | 11/1993 | Japan . |
| 5-325470 | 12/1993 | Japan . |

OTHER PUBLICATIONS

Patent Abstracts of Japan, vol. 017, No. 681 (P–1660), JP 05 225742 A, (Hitachi Ltd.), Sep. 3, 1993.
Patent Abstracts of Japan, vol. 018, No. 552 (P–1815), JP 06 195924 A (Sony Corp.), Jul. 15, 1994.
Patent Abstracts of Japan, vol. 006, No. 209 (P–150), JP 57 113466 A (Sony KK), Jul. 14, 1982.

*Primary Examiner*—David L. Ometz
*Attorney, Agent, or Firm*—Lerner, David, Littenberg, Krumholz & Mentlik, LLP

[57] ABSTRACT

A disc cartridge of a three-piece structure capable of enhancing moldability and rigidity of a center frame. The center frame having a square-like shape is interposedly arranged between an upper plate and a lower plate and has a receiving space defined therein for receiving a disc-like medium. The upper and lower plates are provided on four corners thereof with fixing bosses respectively. The center frame is formed on opposite surfaces thereof with fitting recesses in which the bosses are fitted, respectively. The center frame is formed on each corner thereof with a thin-wall portion having a reduced thickness of 50 to 80% based on a whole thickness of the center frame.

27 Claims, 8 Drawing Sheets

DISC CARTRIDGE

BACKGROUND OF THE INVENTION

This invention relates to a disc cartridge for an MD (mini disc) or the like having a disc-like medium such as an optical disc or the like received therein, and more particularly to such a disc cartridge wherein an upper plate and a lower plate are connected to each other through a center frame interposedly arranged therebetween.

A record medium on which recording and reproducing of data are carried out using magnetism or light is typically received in a casing structure called a disc cartridge, resulting in being charged in a recording and reproducing apparatus provided with a device called a magnetic head or an optical pickup device while being kept received in the casing structure. The disc cartridge prevents dust or contaminant from adhering to the record medium, to thereby contribute to an improvement in operational reliability of the record medium.

For the purpose of carrying out recording and reproducing of data on the record medium in the recording and reproducing apparatus, it is required to keep positional relationship between the record medium and the recording and reproducing device constant to ensure reliability in the recording and reproducing operation. To this end, it is of course required to stably rotate the record medium. Thus, it is generally carried out to adopt a means for providing a surface of the record medium with satisfactory smoothness and flatness.

There are considered factors which deteriorate positional relationship between the record medium and the recording and reproducing device. The factors include vibration externally applied to the recording and reproducing device, vibration generated by a motor incorporated in the recording and reproducing apparatus, and the like. A failure in adoption of any suitable measure against such vibration leads to a failure in satisfactory recording and reproducing. In particular, although a vibration-proof measure is adopted in a recording and reproducing apparatus mounted on an automobile or the like which generates vibration of an increased magnitude, no vibration-proof measure is taken in the disc cartridge itself.

Resin increased in specific gravity has been used for providing a cartridge for a magnetic record medium such as a magnetic tape with increased functionality and quality such as increased sound reproducing characteristics, increased depth characteristics and the like.

More particularly, Japanese Patent Application Laid-Open Publication No. 325470/1993 proposes a magnetic record envelope formed of thermoplastic resin containing of barium sulfate in an amount of 1 to 30% by weight. Composite resin having barium sulfate added thereto in such an amount has specific gravity within a range of from 1.1 to 1.6. Also, Japanese Patent Application Laid-Open Publication No. 307859/1993 discloses a video tape cassette made of a composite resin material of 1.3 to 1.4 in specific gravity containing barium sulfate in an amount of 25 to 35% by weight. As a result of a study by the inventors, it was found that specific gravity within the ranges described above fails to permit the envelope and cassette to exhibit satisfactory vibration-proof characteristics.

Japanese Patent Application Laid-Open Publication No. 119084/1988 discloses a cassette half made of a polypropylene resin composition of 2 or more in specific gravity which contains an inorganic reinforcing material in an amount of 45% by volume of the composition. The organic reinforcing material contains zinc oxide in an mount of from 20 to 100% by weight. Also, Japanese Patent Application Laid-Open Publication No. 57182/1987 discloses a composite plastic material having at least one of calcium carbonate and barium sulfate incorporated therein in an amount of 45 to 65% by weight. The amount of such fillers to be added is said to be determined depending on moldability of the material by injection molding. As a result of a study thereon by the inventors, it was found that an increase in flowability or fluidity of the material or resin facilitates molding of an article complicated in structure due to formation of a number of fine ribs or the like such as a cartridge for a magnetic record medium while providing the article with increased dimensional accuracy and improved appearance and ensuring increased productivity of the article. Also, it was found that the above-described amount of addition of the fillers is excessive for a composite resin material for a magnetic record medium cartridge.

Also, Japanese Patent Application Laid-Open Publication No. 117768/1984 discloses a cassette made of a composite resin material having specific gravity of from 1.5 to 2.2. The publication teaches that zinc oxide, barium sulfate, lead sulfate or the like may be used as an additive or filler for the composite resin material and the amount of the additive or filler may be adjusted within a range of from 40 to 80% by weight. However, it fails to provide any example for illustrating the teaching.

Further, techniques for constructing a cartridge into a three-layer structure is disclosed in Japanese Patent Application Laid-Open Publication No. 113466/1982, Japanese Patent Application Laid-Open Publication No. 78478/1989 and Japanese Utility Model Publication No. 13668/1982. More specifically, Japanese Patent Application Laid-Open Publication No. 113466/1982 merely shows a disc cartridge in drawings thereof. It fails to teach a structure of the disc cartridge. Japanese Patent Application Laid-Open Publication No. 78478/1989 discloses a disc cartridge constructed of a center frame made of a material increased in rigidity and upper and lower plates made of resin. However, it fails to consider vibration-proofness. Japanese Utility Model Publication No. 13668/1982 discloses a tape cartridge constructed of a center frame made of aluminum by die casting and upper and lower plates made of resin. Unfortunately, formation of the center frame by die casting deteriorates productivity of the center frame and therefore the tape cartridge.

A disc cartridge is generally required to exhibit increased reliability in recording and reproducing of a signal. For this purpose, it is required to form the disc cartridge with highly increased configurational accuracy and dimensional accuracy. Also, the disc cartridge is required to exhibit such vibration-proofness as described above in order to stabilize positional relationship between a recording and reproducing device and a record medium. A disc cartridge is generally constructed of two members called an upper half and a lower half, which are formed by injection molding. More specifically, as shown in FIG. 1, a disc cartridge 100 includes an upper half 110 and a lower half 120 which includes ribs 130 for defining a space in which a record medium is received and ribs 140 for arranging an erasure preventing member in the lower half 120. In order to satisfactorily attain molding of the lower half 120 while ensuring configurational and dimensional accuracy thereof, it is required that resin used for the molding exhibits increased flowability or fluidity.

Injection molding generally takes place by injecting a molding resin material into a die. For injection molding of resin deteriorated in flowability, it is required to increase a temperature of the resin to increase flowability of the resin or increase a pressure of the resin, to thereby force the resin into the whole die. Unfortunately, a molded article thus formed is deteriorated in both dimensional accuracy and configurational accuracy. Thus, in order that an article such as a disc cartridge having a complicated and fine structure is molded with increased accuracy, it is highly required that the resin exhibits satisfactory flowability or fluidity. More particularly, in order to ensure operational reliability of a disc cartridge and improve productivity thereof, it is essentially important to use resin moldable as much as possible. Even a slight variation in flowability of the resin substantially affects appearance and dimensional characteristics of the disc cartridge, as well as productivity thereof.

As will be noted from the foregoing, there have been made a lot of proposals which attempt to ensure vibration proofness of a disc cartridge by selection of specific gravity of a molding material or resin and addition of a filler to the resin. However, the prior art substantially fails to fully consider a reduction in flowability or fluidity of the resin due to addition of the filler thereto or a deterioration in moldability of the resin, leading to a failure to provide a disc cartridge which is capable of meeting requirements on both vibration proofness and moldability.

Also, an increase in amount of the filler to be added to the molding resin causes the disc cartridge to be brittle, resulting in the disc cartridge being decreased in resistance to shock.

Now, the conventional disc cartridge of a three-piece structure disclosed in Japanese Patent Application Laid-Open Publication No. 78478/1989 described above will be described with reference to FIG. 2A. The disc cartridge indicated at reference numeral 200 includes an upper plate 230 and a lower plate 210 with a center frame 220 being interposedly arranged therebetween, resulting in being constructed into a three-piece structure, leading to an increase in rigidity. In the disc cartridge 200 thus constructed, a reduction in thickness thereof requires to reduce a thickness of the center frame 220. Unfortunately, a decrease in thickness of the center frame 200 deteriorates flowability of resin during molding of the disc cartridge.

The center frame 220 has a recess 221 of a substantially square-like shape defined therein for receiving a disc-like record medium 240 therein. However, formation of the square-like recess 221 in the center frame 220 causes corners of the center frame 220 to be decreased in thickness, leading to a deterioration in rigidity of the center frame 220. In order to avoid such a problem, a center frame designated at reference numeral 320 in FIG. 2B is provided, which is formed with a circular recess 321 for receiving a disc-like record medium 240 therein. The circular recess 321 permits corners of the square-like center frame 320 to be increased in thickness. Unfortunately, this causes a thickness of a central portion of the center frame to be reduced, to thereby still fail to ensure satisfactory rigidity of the center frame 320.

Also, the disc cartridge disclosed in Japanese Patent Application Laid-Open Publication No. 78478/1989 is so constructed that the upper and lower plates are secured to the center frame by means of screws. In addition, assembling of the disc cartridge is carried out by mounting the center plate on the lower plate to form a subassembly, incorporating the record medium, a plug, a shutter lock and the like in the subassembly, and mounting the upper plate on the subassembly.

Thus, in the disc cartridge disclosed, the upper and lower plates of a square-like configuration are screwed to the center frame of a square-like configuration. This results in the disc cartridge being substantially identical with a disc cartridge of a two-piece structure constructed of only an upper plate and a lower plate. Thus, in order to increase rigidity of the disc cartridge, it is required that the center frame is formed of resin having a reinforcing material added thereto. For the same purpose, it is also required that a region of the center frame in which the disc-like record medium is received is increased in thickness. Unfortunately, this causes an increase in whole thickness of the center frame, as well as generation of sink marks in a thin-wall region of the center frame, leading to a deterioration in appearance. It would be considered to form the center frame with lightening holes in order to avoid an increase in thickness of the center frame and generation of the sink marks. This causes a reduction in rigidity of the center frame although it improves appearance of the center frame. The center frame is subject to warpage depending on formation of the lightening holes, resulting in configurational accuracy of the center frame being deteriorated, leading to a failure in satisfactory assembling of the disc cartridge.

SUMMARY OF THE INVENTION

The present invention has been made in view of the foregoing disadvantages of the prior art.

Accordingly, it is an object of the present invention to provide a disc cartridge which is capable of ensuring increased reliability in operation thereof and increasing productivity thereof.

It is another object of the present invention to provide a disc cartridge of a three-piece structure which is capable of increasing both formability and rigidity of a center frame.

It is a further object of the present invention to provide a disc cartridge which is capable of increasing rigidity of a center frame and preventing generation of sink marks on the center frame and warpage of the center frame, resulting in ensuring satisfactory assembling of the disc cartridge.

It is still another object of the present invention to provide a disc cartridge which is capable of increasing dimensional and configurational accuracy of the disc cartridge while ensuring good appearance thereof.

In accordance with the present invention, a disc cartridge is provided. The disc cartridge includes an upper plate, a lower plate, and a center frame arranged between the upper plate and the lower plate so as to join the upper plate and lower plate to each other therethrough. The center frame is constituted by a circumferential member of a square-like shape as viewed in plan which is formed so as to continuously surround a disc-like medium. The upper and lower plates are provided on four corners thereof with fixing bosses, respectively, wherein the fixing bosses of the upper plate and those of the lower plate are arranged in a manner to be opposite to each other. The center frame is formed on opposite surfaces thereof with fitting recesses in which the bosses are fitted, respectively. Also, the center frame is formed on each of four corners thereof with a thin-wall portion having a reduced thickness of 50 to 80% based on a whole thickness of the center frame.

In a preferred embodiment of the present invention, the center frame is partly recessed in a surface thereof opposite to the lower plate to provide the thin-wall portions.

In a preferred embodiment of the present invention, the thin-wall portions are each arranged in a region of the center frame between an outer peripheral portion of a respective one of the four corners of the center frame and an inner peripheral portion thereof so that the outer and inner peripheral portions have the whole thickness.

In a preferred embodiment of the present invention, the disc cartridge further includes an erasure preventing plug. The center frame is provided in an outer surface thereof with a cutout in which the erasure preventing plug is arranged. The corner of the center frame in proximity to the cutout is so arranged that a distal end thereof is positioned inside an outer edge of the upper and lower plates.

In a preferred embodiment of the present invention, the upper and lower plates and the center plate are integrally joined together by means of screws threadedly inserted in the bosses and fitting recesses.

In a preferred embodiment of the present invention, the upper and lower plates and the center plate are integrally joined together by bonding the bosses to the fitting recesses by welding.

In a preferred embodiment of the present invention, at least one of the upper and lower plates is provided thereon with projections in a manner to be opposite to the thin-wall portions of the center plate, to thereby enhance rigidity of the disc cartridge.

In a preferred embodiment of the present invention, the center frame has a circular receiving space defined therein in which the disc-like medium is received. The circular receiving space is defined by an inner peripheral surface of the center frame. The center frame has gate positions for molding thereof defined therein. The gate positions are each defined so as to be angularly deviated from an intersection between the inner peripheral surface of the center frame and a line defined by connecting a center of the receiving space and a respective one of corners of the center frame to each other.

In a preferred embodiment of the present invention, the gate positions are defined in respective recesses formed in the inner peripheral surface of the center frame.

In a preferred embodiment of the present invention, the center frame is made of a composite resin material prepared by mixing resin selected from the group consisting of acrylonitrile-butadiene-styrene resin, polycarbonate resin, polystyrene resin and polyamide resin with a metal powder.

In a preferred embodiment of the present invention, the center frame is made of a composite resin material of 2.5 or more in specific gravity prepared by mixing resin with a filler.

In a preferred embodiment of the present invention, the center frame is formed with a volume of 20 to 60% based on a combined volume of the upper and lower plates.

In a preferred embodiment of the present invention, the filler contained in the composite resin material is an amount of 50 parts by volume or less based on 100 parts by volume of the resin.

In a preferred embodiment of the present invention, the filler is a tungsten powder. Alternatively, the filler may be a stainless steel powder.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
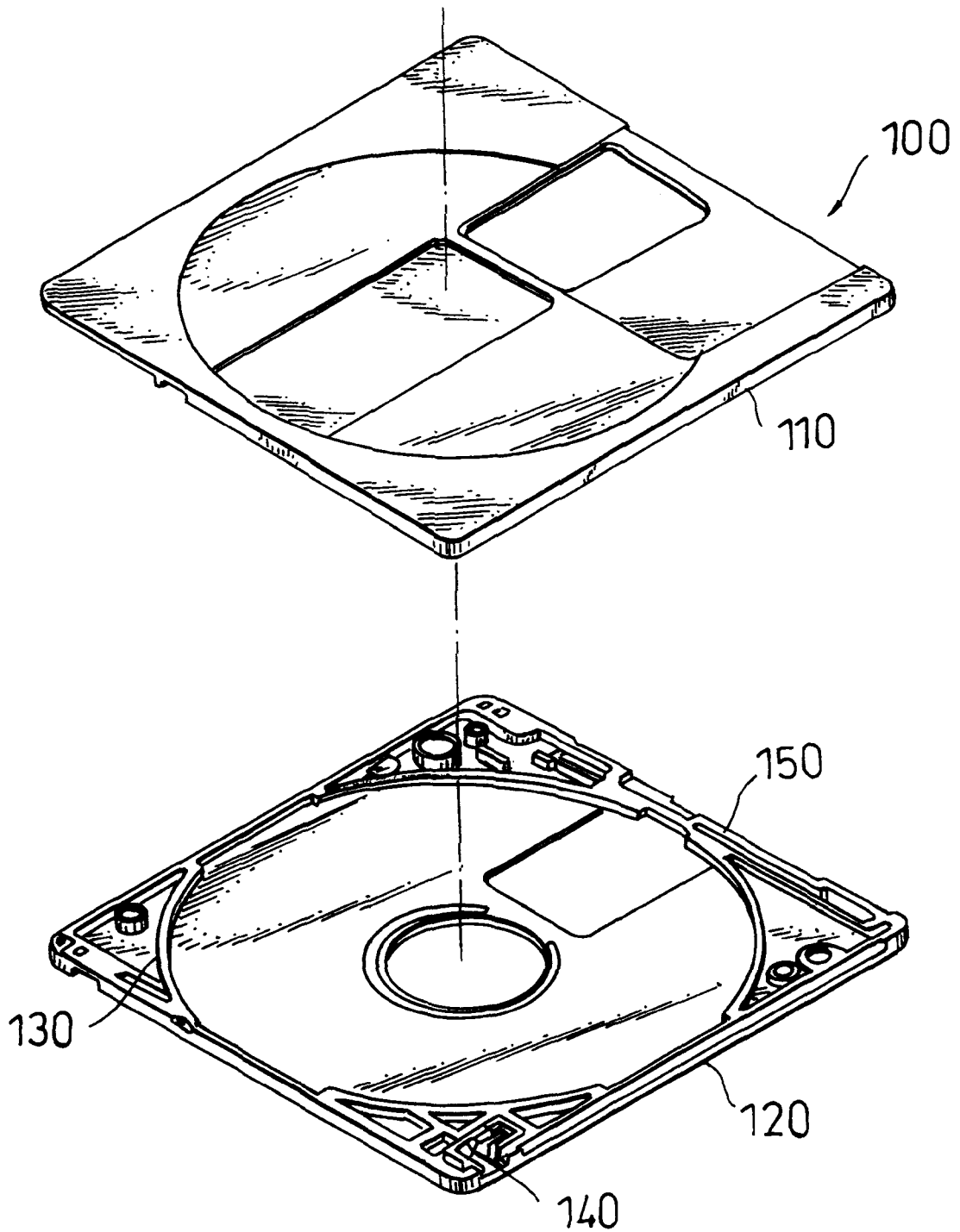
FIG. 1 is an exploded perspective view showing a conventional disc cartridge by way of example.
Figure 2A:
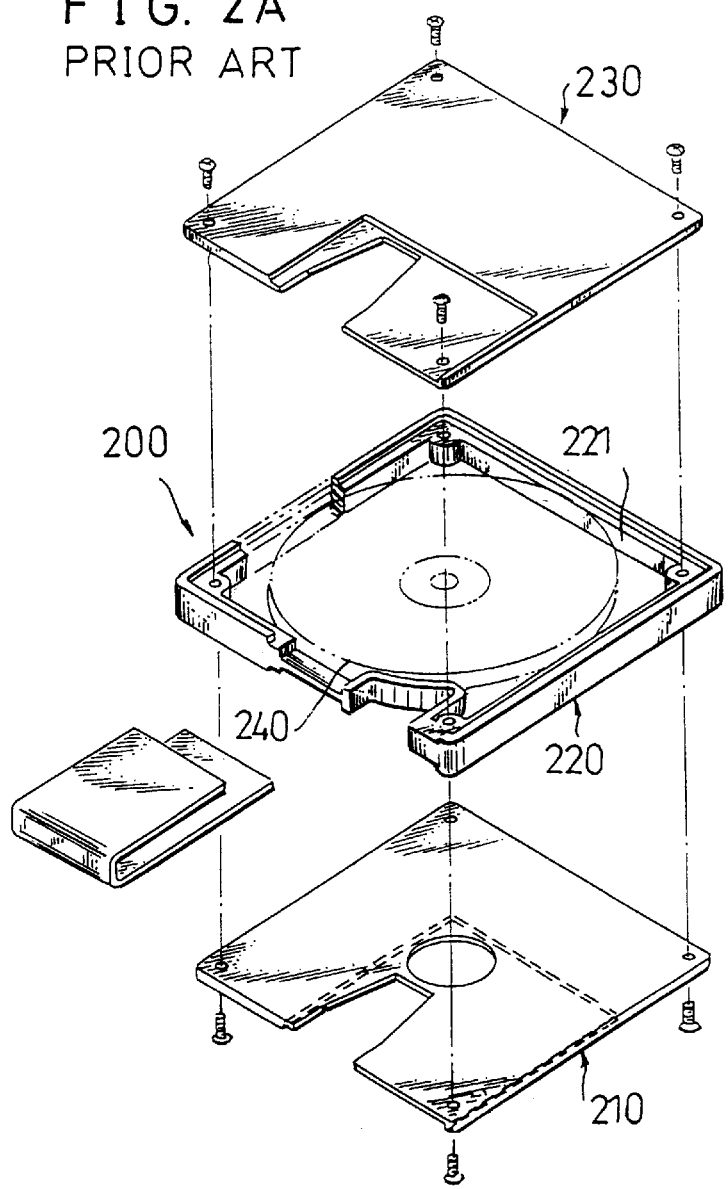
FIG. 2A is an exploded perspective view showing another example of a conventional disc cartridge.
Figure 2B:
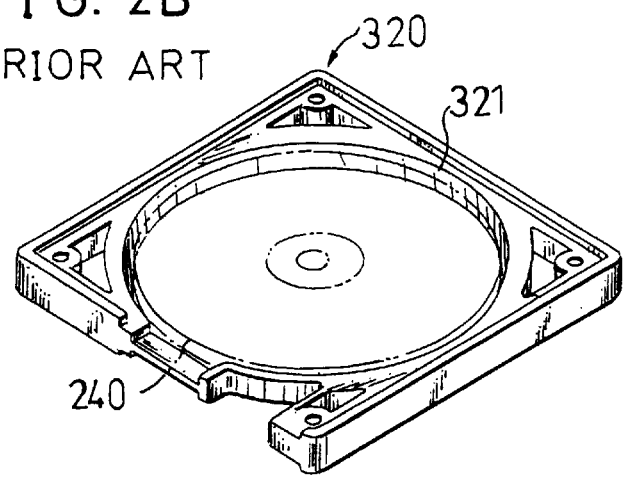
FIG. 2B is a perspective view showing a center frame incorporated in a further example of a conventional disc cartridge.

Now, a disc cartridge according to the present invention will be described hereinafter with reference to FIGS. 3 to 16, wherein like reference numerals designate like or corresponding parts throughout.

Figure 3:
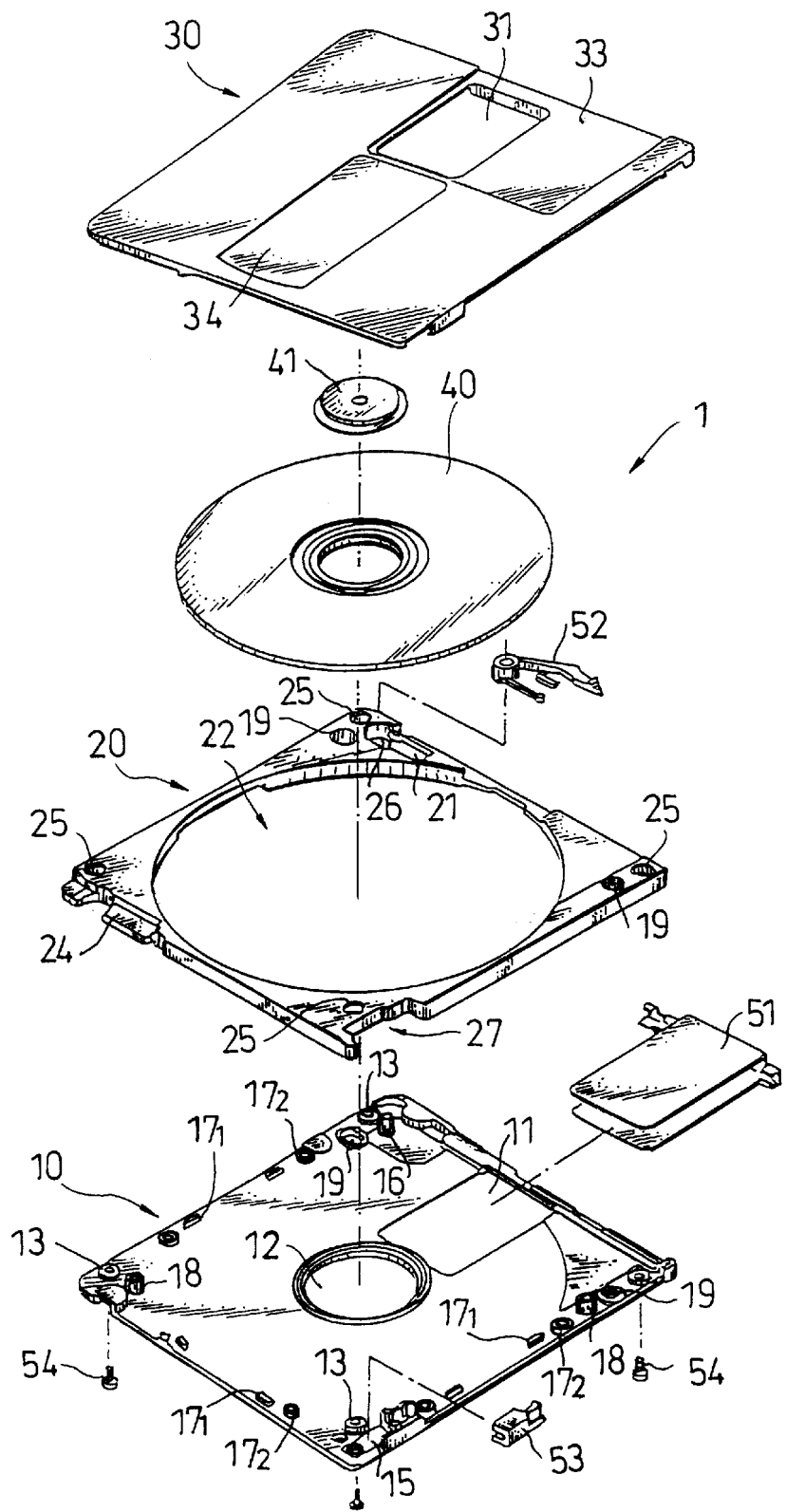
FIG. 3 is an exploded perspective view showing an embodiment of a disc cartridge according to the present invention.

Referring first to FIG. 3, an embodiment of a disc cartridge according to the present invention is illustrated. A disc cartridge 1 of the illustrated embodiment is constructed into a three-piece structure and includes a lower plate 10, an upper plate 30 and a center frame 20. The lower plate 10 and upper plate 30 are joined to each other through the center frame interposedly arranged therebetween. The disc cartridge thus constructed has a disc-like medium 40 such as an optical disc received therein. Also, in the illustrated embodiment, the upper plate 30 and lower plate 10 are made of a transparent or translucent material, so that the center frame 20 and disc-like medium 40 may be externally observed through the upper plate 30 or lower plate 10.

The lower plate 10 and upper plate 30 are formed at a portion thereof in proximity to predetermined one edge thereof with an opening or head insertion hole 11 and an opening or drive shaft insertion hole 31, respectively, through which a part of the disc-like medium 40 is exposed, as in the prior art. The disc-like medium 40 is provided at a central portion thereof with a hub 41. Reference numeral 51 designates a shutter which is arranged so as to straddle the upper and lower plates 30 and 10 while sliding thereon so as to selectively shut or cover the openings 11 and 31 as desired. Also, the lower plate 10 is formed at a substantially central portion thereof with an opening 12, through which the hub 41 of the disc-like medium 40 is exposed.

The lower plate 10 is provided on a portion thereof in proximity to four corners thereof with screwing bosses 13, each of which is formed with a through-hole and arranged so as to project in an upward direction or toward the center frame 20. Also, the lower plate 10 is provided on a portion thereof in proximity to one of the corners thereof with a support boss 16 for supporting a shutter lock 52. The shutter lock 52 is arranged so as to constantly urge the shutter 51 in a direction in which the shutter 51 is closed. Further, the lower plate 10 is provided on a portion thereof in proximity to another one of the corners thereof with a plug mount 15 on which an erasure preventing plug 53 is mounted. The erasure preventing plug 53 functions to prevent miserasure of data recorded on the disc-like medium 40.

Figure 4:
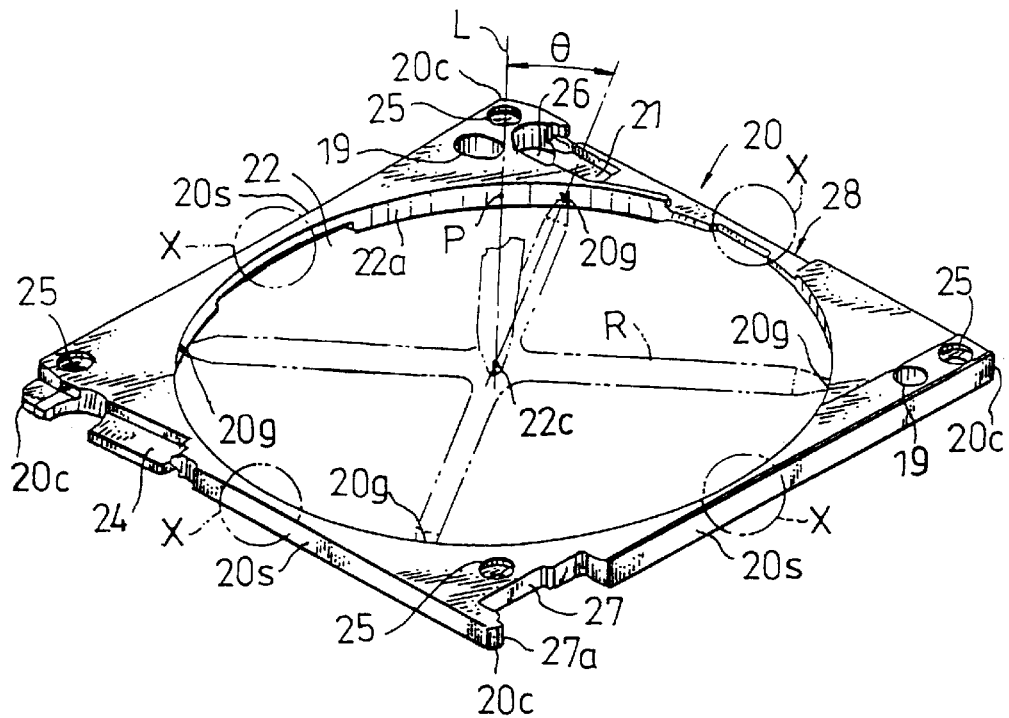
FIG. 4 is a perspective view showing a top side of a center frame incorporated in the disc cartridge shown in FIG. 3.

The center frame 20 may be constructed in such a manner as shown in FIG. 4. The center frame 20 may be made of a material having heat resistance and exhibiting increased rigidity such as, for example, a material of increased specific gravity prepared by mixing acrylonitrile-butadiene-styrene (ABS) resin, polycarbonate (PC) resin, polystyrene (PS) resin or polyamide (PA) resin with a metal powder. Metals for the metal powder include tungsten, iron, phosphor iron, ferrite, copper, zinc, lead and the like. A powder of a substance other than metal may be used. The substances include, for example, barium sulfate and the like. The metal powder may be preferably added in an amount of 5 to 50% by weight. The material for the center frame 20 preferably has specific gravity of 2.5 or more, more particularly 2.5 to 4.5. The specific gravity within such a range permits cutting of resin at gate portions to be improved during molding of the center frame. The center frame may be subjected to a coating treatment to improve an appearance thereof.

The center frame 20 may be constituted by a frame member of a substantially square-like shape which is formed therein with a circular receiving space 22 for receiving the disc-like medium 40 therein. Thus, the center frame 20 is continuous unlike a non-continuous member of a C-like shape or the like, resulting in exhibiting increased rigidity.

Figure 11:
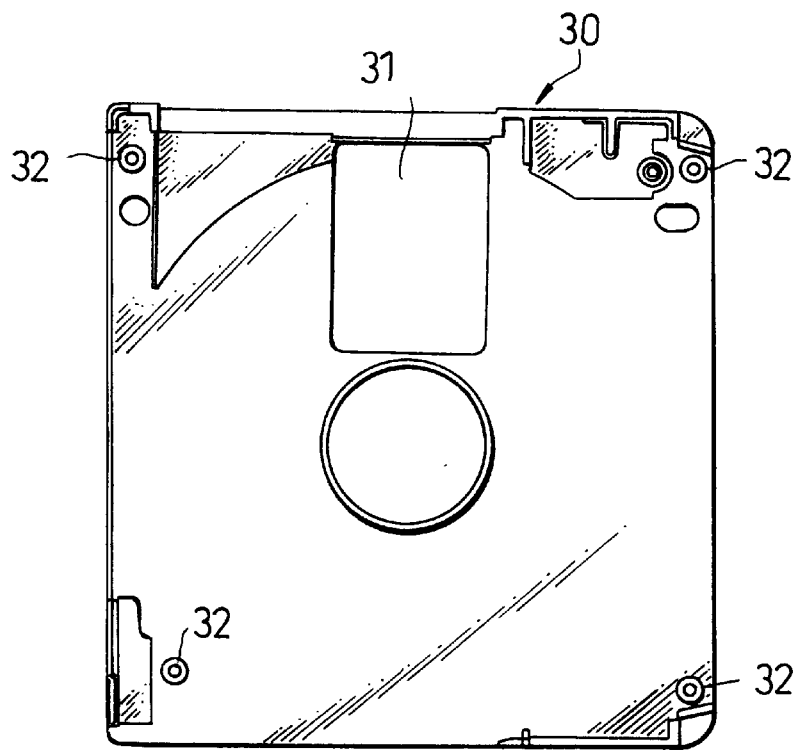
FIG. 11 is an enlarged plan view showing an inner side of an upper plate incorporated in the disc cartridge of FIG. 3.
Figure 12:
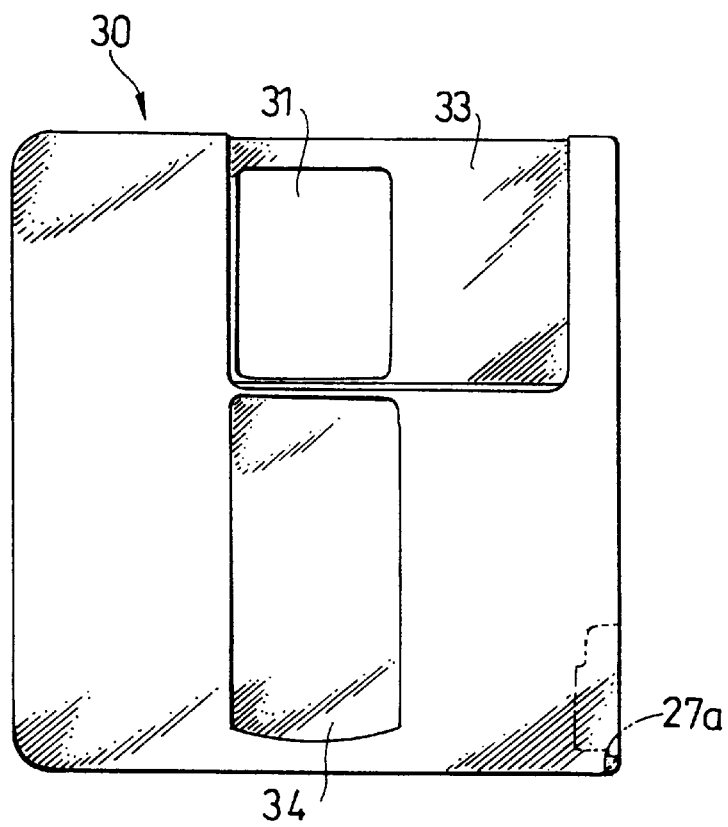
FIG. 12 is an enlarged plan view showing an outer side of the upper plate of FIG. 11.
Figure 13:
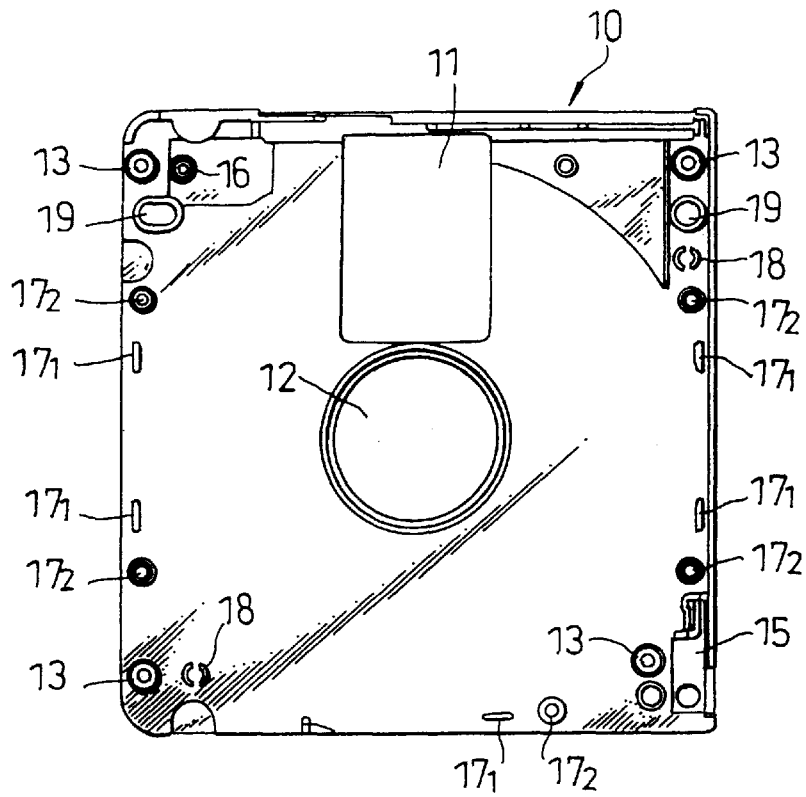
FIG. 13 is an enlarged plan view showing an inner side of a lower plate incorporated in the disc cartridge of FIG. 3.
Figure 14:
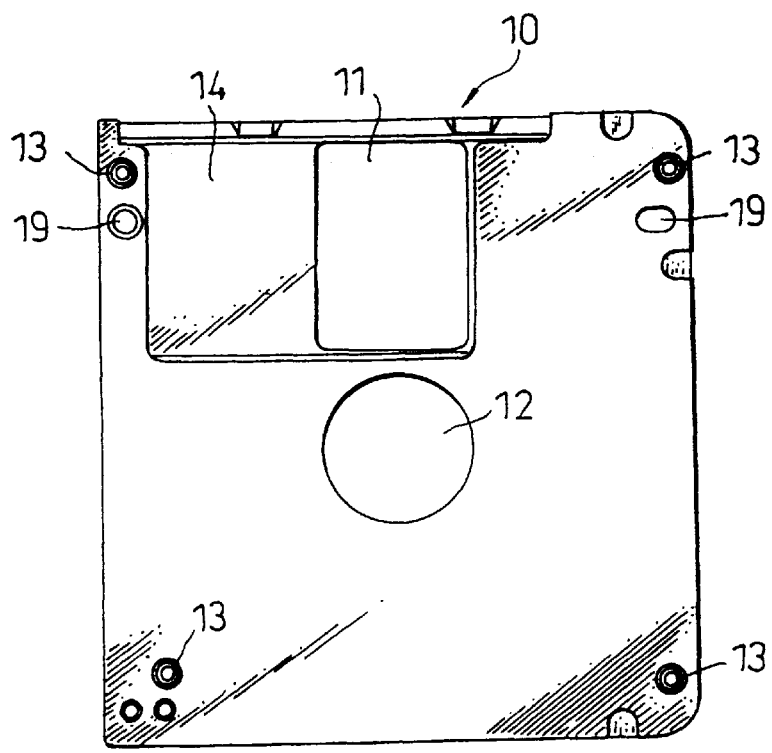
FIG. 14 is an enlarged plan view showing an outer side of the lower plate of FIG. 11.

Also, the center frame 20 is formed on a portion thereof in proximity to each of four corners thereof on an upper surface thereof with an engagement recessed in section or a fitting recess 25, in which a respective one of bosses 32 provided on the upper plate 30 is engagedly fitted when the upper plate 30 is mounted on the center frame 20 (FIG. 11). Such engagements or recesses 25 are likewise provided on a rear surface of the center frame 20, so that the screwing bosses 13 of the lower plate 10 are fitted in the recesses 25, respectively.

Further, the center frame 20 is formed at a portion thereof in proximity to one of the corners with a shutter lock receiving recess 21 reduced in thickness. The shutter lock receiving recess 21 is formed at a part thereof with a through-hole 26, so that the support boss 16 of the lower plate 10 may be projected above the center frame 20 via the through-hole 26 when the center plate 20 is mounted on the lower plate 10.

In addition, the center frame 20 is formed on an edge portion thereof in proximity to one of the corners thereof diagonally opposite to the shutter lock receiving recess 21 with a cutout 27. The cutout 27 may be formed by cutting out the edge portion into a substantially recess-like shape. The cutout 27 is formed so as to surround the plug mount 15 of the lower plate 10, to thereby prevent interference between the center frame 20 and the plug mount 15 when the center frame 20 is mounted on the lower plate 10. The cutout 27 is arranged in proximity to the corner of the center frame 20 while leaving the corner, so that arrangement of the cutout 27 is kept from deteriorating appearance of the center frame 20.

The erasure preventing plug 53 is mounted on the plug mount 15, followed by arrangement of the center frame 20 and disc-like medium 40 on the lower plate 10. Mounting of the center plate 20 on the lower plate 10 permits the screwing bosses 13 of the lower plate 10 to be respectively fitted in the recesses 25 of the center frame 20 and the support boss 16 of the lower plate 20 to be upwardly projected via the through-hole 26 of the center frame 20 from the center frame 20.

Also, the shutter lock 52 is supported on the support boss 16 and arranged in the shutter lock receiving recess 21 of the center frame 20. The plug mount 15 of the lower plate 10 is received in the cutout 20 of the center frame 20.

Then, the upper plate 30 is mounted on the center fame 20 and screws 54 are upwardly threadedly inserted through the screwing bosses 13 of the lower plate 10 from a bottom side of the lower plate 10, to thereby securely joining or coupling the lower and upper plates 10 and 30 to each other with the center frame 20 being interposed therebetween, resulting in the disc cartridge 1 being assembled. Alternatively, such coupling between the lower plate 10 and the upper plate 30 may be carried out by welding rather than by screwing.

Now, formation of the center frame 20 by molding will be described with reference to FIGS. 4 to 10. It would be considered that gate positions at which molding of the center frame 20 is executed are defined on either a side surface 20s of the center frame 20 or any one of upper and lower surfaces of the center frame 20 in proximity to corners 20c of the center frame 20. However, the side surface 20s is exposed to an ambient environment, so that arrangement of the gate positions on the side surface 20s leads to a deterioration in appearance of the center frame 20. Also, arrangement of the gate positions on the upper or lower surface of the center frame 20 in proximity to the corners 20c causes gate portions to be in sight when the upper plate and/or lower plate are made of a transparent or translucent material, resulting in appearance of the center frame 20 being deteriorated. It also causes an increase in length of a runner of a die, leading to waste of molding resin.

In order to avoid such problems as described above, the illustrated embodiment, as shown in FIG. 4, is so constructed that the center frame 20 has gate positions 20g defined at angular intervals of 90 degrees on an inner peripheral surface 22a of the center frame 20 defining or surrounding the receiving space 22. Such arrangement of the gate positions 20g permits the gate positions to be substantially out of sight even when the upper plate 30 or lower plate 10 is made of a transparent or translucent material. Also, it permits a reduction in length of runners R during molding of the center frame 20. In FIG. 4, the runners R during the molding are indicated by two-dot chain lines. Such arrangement of the runners R leads to saving of molding resin. In particular, it exhibits a significant advantage when resin having a metal powder added thereto is used for the center frame 20 as in the illustrated embodiment. Arrangement of the gate positions 20g at angular intervals of 90 degrees or equal angular intervals permits resin to flow in a balanced manner during the molding.

Also, the gate positions 20g are each defined in proximity to an intersection P between the inner peripheral surface 22a of the center frame 20 and a line L defined by connecting a center 22c of the receiving space 22 and a respective one of the corners 20c of the center frame 20 to each other or so as to be deviated by a predetermined angle θ from the intersection P.

When the gate positions 20g are each defined while being rendered coincident with a corresponding one of the intersections P, a weld line or weld mark is caused to be generated at each of central portions X of the center frame 20 which have the smallest wall thickness, resulting in the center frame 20 being reduced in strength or rigidity. Thus, in the illustrated embodiment, each of the gate positions 20g is defined in proximity to the intersection P or while being deviated by a predetermined angle θ from the intersection P, to thereby keep the position of generation of the weld line from being at the central portion of the center frame 20, resulting in preventing a reduction of strength of the center frame 20.

The inner peripheral surface 22a of the center frame 20 defines the receiving space 22 for receiving the disc-like medium 40 therein. Therefore, when a residue of the gate projects into the receiving space 22, the residue interferes with the disc-like medium 40, to thereby cause damage to the disc-like medium 40 and generation of shavings, leading to dropout.

In order to avoid the problem, a tunnel gate or submarine gate is preferably used for molding of the center frame 20. Use of the tunnel gate permits automatic cutting of the gate portions of the center frame 20, to thereby eliminate any post-treatment. Also, such selection of a material for the center frame and specific gravity thereof as described above effectively prevents retention of resin at the gate portions of the center frame 20.

Further, in the illustrated embodiment, the upper plate 30 and lower plate 10 may each be provided thereon with ribs in a manner to enter the receiving space 22 at the gate positions 20g of the center frame 20. Such construction prevents contact between the disc-like medium 40 and the inner peripheral surface 22a of the center frame 20.

Figure 5:
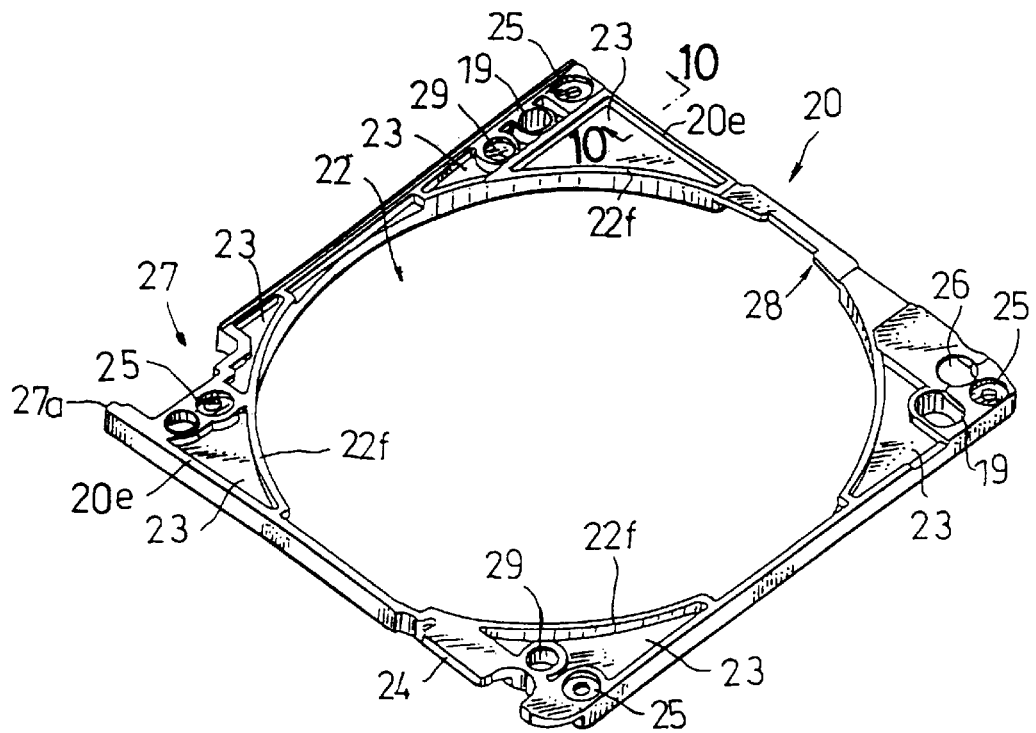
FIG. 5 is a perspective view showing a bottom side of the center frame shown in FIG. 4.
Figure 6:
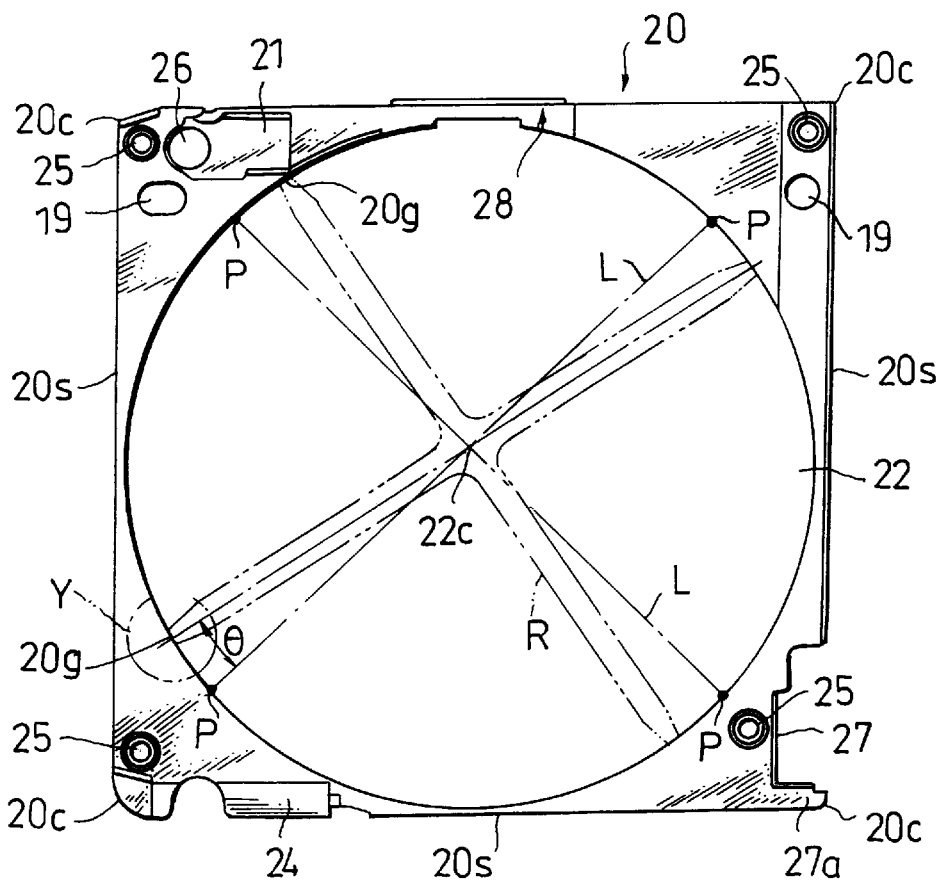
FIG. 6 is a plan view showing the center frame shown in FIG. 4.
Figure 10:
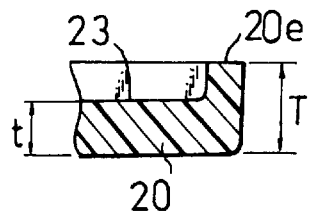
FIG. 10 is a sectional view taken along line 10—10 of FIG. 5.

Referring now to FIG. 5, the center frame 20 is illustrated while keeping a lower side thereof facing up. The center frame 20 is formed at each of four corners thereof with a thin-wall portion 23 which has a reduced thickness of 50 to 80% based on a whole thickness of the center frame 20, to thereby provide the center frame 20 with good appearance. More particularly, the thin-wall portions 23 are arranged on only one surface of the center frame 20 facing the lower plate 10. The thin-wall portions 23 are each arranged in a region of the center frame 20 between an outer peripheral portion of a respective one of the four corners of the center frame 20 and an inner peripheral portion thereof so that the outer and inner peripheral portions are respectively defined by walls 20e and 22f having a hight equal to a whole thickness T of the center frame 20. The thin-wall portions 23 are formed with a reduced thickness t of 50 to 80% based on the whole thickness T of the center frame 20 ($0.8T \geq t \geq 0.5T$), as shown in FIG. 10. For example, supposing that the disc cartridge is 5 mm in thickness, the lower plate 10 and the upper plate 30 may each have a thickness of 1 mm, and the whole thickness T of the center frame 20 may be 3 mm; the reduced thickness t of the thin wall portions 23 may be about 2 mm. In this instance, the thickness t below 1.5 mm causes warpage of the center frame 20, whereas the thickness t of 2.5 mm or more leads to generation of sink marks on a front surface of the center frame 20.

Thus, an increase in thickness of all four corners of the center frame 20 causes sink marks to occur on the center frame 20, leading to a deterioration in appearance of the center frame 20. Also, a failure in satisfactory reduction in thickness of the corners likewise causes generation of the sink marks, whereas an excessive reduction in thickness results in a reduction in rigidity of the center frame 20, as well as warpage thereof. In addition, formation of the center frame in a manner to continuously extend around a whole circumference of a disc-like medium permits the disc cartridge to exhibit increased rigidity without a necessity of adding any reinforcing material to molding resin, as compared with a conventional disc cartridge of a two-piece structure constructed of only upper and lower casing members. Addition of any reinforcing material such as, for example, glass, carbon, born or the like to the center frame 20 may ensure a further increase in rigidity of the center frame.

Also, in the center frame 20 of the recess 21, cutout 27 and recesses 25 in which parts for the disc cartridge are respectively incorporated, and reference holes 19, a head insertion recess 28 and an engagement 24 which are associated with a recording and reproducing apparatus are each reduced in thickness or provided in the form of a hole. The remaining part of the center frame may be increased in thickness to ensure satisfactory rigidity of the center frame 20.

A reduction in thickness of the whole center frame 20 causes a decrease in rigidity of the center frame 20. Thus, an upper plate 30 and the lower plate 10 may each be provided at portions thereof corresponding to the thin-wall portions 23 with projections 17, and 172, to thereby enhance rigidity of the whole disc cartridge. Instead, a molding resin material for the center frame 20 may have a reinforcing material added thereto.

Figure 7:
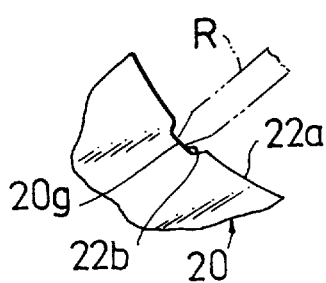
FIGS. 7 and 8 each are a fragmentary schematic plan view showing a portion encircled by two-dot chain lines Y in FIG. 6.
Figure 8:
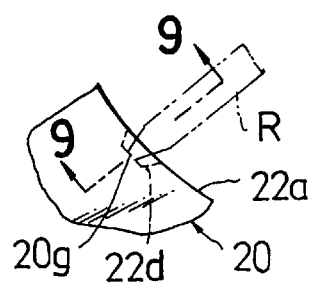
Figure 9:
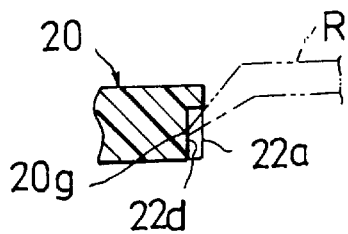
FIG. 9 is a sectional view taken along line 9—9 of FIG. 8.

Referring now to FIGS. 6 to 9, the center frame 20 is constructed in such a manner that the gate positions 20g are each formed in a recess 22b or 22d in a manner to surround the gate position 20g, as shown in FIGS. 7 to 9. This results in surroundings of the gate positions 20g being recessed from the inner peripheral surface 22a of the center frame 20 defining the receiving space 22 for receiving the disc-like medium 40 therein, to thereby prevent any residue of gates from entering a region of the receiving space 22, resulting in eliminating any interference between the residue of the gates and the disc-like medium 40. In particular, formation of each recess 22d at a portion of the center frame 20 other than an upper portion thereof as shown in FIGS. 8 and 9 substantially keeps the recess 22d out of sight, to thereby improve appearance of the center frame 20, even when it is made of a transparent or translucent material.

The illustrated embodiment is directed to an MD in which an optical disc is used as the disc-like medium 40 by way of example. Alternatively, it may be applied to a disc-like medium other than an optical disc, such as, for example, a magnetic disc or the like.

As will be noted from the above, the illustrated embodiment permits the runners to be reduced in length, so that molding resin may be used without any significant waste thereof. Also, it permits the gate portions of the center frame to be out of sight even when the upper or lower plate is made of a transparent or translucent material. Further, it keeps any weld line from being generated at a central region of the center frame, to thereby effectively prevent a reduction in strength or rigidity of the center frame. In addition, it prevents retention of resin at the gate portions of the center frame during molding thereof and increases rigidity of the center frame. Moreover, it eliminates any interfere between the gate portions of the center frame and the disc-like medium received therein.

Also, the illustrated embodiment may be constructed in such a manner as shown in FIGS. 11 to 14. In FIGS. 11 to 14, the upper and lower plates 30 and 10 may be provided with welded joints in place of the screwing bosses 32 and 13.

Also, the center frame 20 is formed on both upper and lower surfaces thereof with recesses in a manner to be opposite to the welded joints, so that the welded joints of the plates 30 and 10 are engagedly fitted in the recesses to integrally assemble the disc cartridge. Alternatively, the embodiment may be so constructed that the screwing bosses 32 and 13 of the upper plate 30 and lower plate 10 are arranged so as to be opposite to each other, the center frame 20 is formed on both surfaces thereof with the recesses 25 (FIGS. 4 to 6) in which the screwing bosses 32 and 13 are engagedly fitted, and the upper plate 30 and/or lower plate 10 are provided with fit bosses 18 in a manner to be opposite to each other. The fit bosses 18 thus arranged function to prevent disassembling of the disc cartridge during assembling thereof and ensure secure integrity of the disc cartridge after the assembling.

The fit bosses 18 are formed with a vertical length or height greater than a height of the screwing bosses 13 of the lower plate 10. The center frame 20 is provided with blind holes or through-holes 29 in which the fit bosses 18 are respectively fitted. The fit bosses 18 of the lower plate 10 are fitted in the holes 29 of the center frame 20 to ensure firm engagement between the center frame 20 and the lower plate 10, when the disc cartridge is assembled. Thus, the fit bosses 18 act as auxiliary fixing means for promoting firm joining between both plates and function to prevent warpage of the disc cartridge.

Instead, the upper plate 30 and lower plate 10 may be securely joined to each other by means of tapping screws and the fit bosses 18 of the plates 30 and 10 may be abutted on an end surface thereof against to each other in through-holes of the center frame 20. Then, the end surfaces of the fit bosses 18 abutted against to each other are welded together. Alternatively, the end surfaces of the fit bosses 18 may be abutted against an inner surface of the upper plate 30.

In the illustrated embodiment, the disc cartridge 1 and therefore the center frame 20 may be formed with a substantially square shape. The center frame 20 is formed at a portion thereof in which parts for the disc cartridge or parts for the recording and reproducing device are arranged or inserted into a reduced thickness or with the holes. This may cause a possibility that the center frame 20 fails to exhibit sufficient strength due to unavoidable formation of any rib-like projection 27a such as the corner of the center frame 20 at which the erasure preventing plug insertion recess 27 is formed. In such a case, in order to prevent breakage of the projection 27a, the corners of the upper and lower plates 30 and 10 may be rounded at a radius curvature smaller than that of the corner of the center frame 20 at which the projection 27a is arranged. This permits the projection 27a to be positioned inside the outer edge of the upper and lower plates 30 and 10 when the disc cartridge is assembled.

In the illustrated embodiment, the thin-wall portions 23 of the center frame 20 are arranged on the lower surface and/or upper surface of the center frame 20. When the upper and lower plates 30 and 10 are made of a transparent or translucent resin material, the thin-wall portions 23 may be formed from one of upper and lower surfaces of the center frame 20, to thereby prevent the thin-wall portions 23 from being in sight. Also, this prevents warpage of the center frame 20. In the illustrated embodiment, the thin-wall portions 23 are formed on the rear surface of the center frame 20.

Also, in the illustrated embodiment, the upper plate 30 is formed on an upper or outer surface thereof with a shutter slide area 33 and a label sticking area 34. Likewise, the lower plate 10 is formed on a lower or outer surface thereof with a shutter slide area 14. The shutter 51 of a substantially U-shape in section is slidably fitted on the disc cartridge so as to be slid on the shutter slide areas 33 and 14, to thereby selectively cover the head insertion holes 31 and 11 and the drive shaft insertion hole 12. The drive shaft insertion hole 12 is formed at substantially the central portion of the lower plate 10, so that the drive shaft of the recording and reproducing apparatus is inserted into the drive shaft insertion hole 12, to thereby be operatively connected to a clamping pin mounted on the disc-like medium 40.

In the illustrated embodiment, the lower plate 10 is provided with two such positioning bosses 18. Alternatively, three or more such positioning bosses may be provided on the lower plate 10. However, arrangement of only one such boss sufficiently ensures positive fixing of the center frame 20 on the lower plate 10. Also, two such fit bosses 18 are arranged on each of the upper and lower plates in a manner to be diagonally opposite to each other. Alternatively, one or more fit bosses may be arranged on an outer edge of each of three sides of each plate other than the side thereof on which the shutter 51 is arranged.

Thus, it will be noted that the illustrated embodiment permits an increase in rigidity of the center frame and prevents generation of any sink mark on the center frame and any warpage thereof, leading to an improvement in both dimensional accuracy and appearance of the center frame and therefore the disc cartridge and an improvement in assembling of the disc cartridge.

As described above, in the prior art, resin increased in specific gravity has been used for providing the disc cartridge with increased functionality and quality such as increased sound reproducing characteristics, increased depth characteristics and the like. As a result of a study by the inventors, it was found that formation of a disc cartridge using only a composite resin material increased in specific gravity permits the disc cartridge to exhibit such characteristics when the specific gravity is 1.8 or more.

However, addition of a filler to molding resin to increase specific gravity of the resin causes a thus-obtained composite resin material which is a mixture of the resin with the filler to be reduced in flowability or fluidity with an increase in loadings of the filler. The prior art substantially failed to consider that fluidity of the resin is closely relevant to a volume of the filler to be added to the resin rather than a weight of the filler. A careful study by the inventors revealed that in order to ensure moldability of a molded article of a fine structure, the content of filler in the composite resin material is preferably 20 parts by volume or less based on 100 parts by volume of the resin. The amount of filler above 20 parts by volume causes a deterioration in dimensional accuracy and appearance of a molded article and an increase in period of time required for the molding, although it permits the molding under elevated temperature and pressure conditions.

The disc cartridge which is a molded product reduced in thickness is reduced in resistance to torsional stress as compared with a cartridge for an audio tape or that for a video tape. Thus, it is preferably constructed into a three-piece structure so as to exhibit rigidity, as proposed in Japanese Patent Application Laid-Open Publication No. 78478/1989 described above.

In the illustrated embodiment, the disc cartridge is constructed into a three-layer or three-piece structure including the upper and lower plates 30 and 10 and the center frame 20, wherein the upper and lower plates 30 and 10 are made of resin conventionally used in the art and the center frame 20 is made of a composite resin material containing both resin and a filler. Such construction permits the center frame 20 to be constructed into a simple structure free of any rib. Also, it ensures satisfactory molding of the center frame 20 even when a filler content is increased to a level as high as 50 parts by volume based on 100 parts by volume of the resin.

Also, when the filler added to the resin for preparation of the composite resin material is in the form of a powder, an increase in volume of the filler causes the composite resin material to be hard and brittle. The above-described construction of the disc cartridge into the three-piece structure permits the upper and lower plates 30 and 10 made of resin free of any filler to interposedly protect the center frame 20 made of the composite resin material described above, so that the composite resin material used for molding the center frame 20 may contain the filler in a large amount as compared with when a disc cartridge is made of only the composite resin material.

It was found that when the disc cartridge is constructed into the three-piece structure, specific gravity of the center frame 20 of 2.5 or more leads to the above-described vibration-proofness of the center frame 20 or disc cartridge. Although specific gravity of the center frame 20 does not have any upper limit, an upper limit of the specific gravity is about 7 in view of loadings of the filler restricted by the above-described moldability, commercially available materials for the center frame and the like.

Also, it was found that when the center frame 20 has a volume of 20% or more based on a combined volume of the upper and lower plates 30 and 10 and the center frame 20, the above-described vibration-proofness is improved. However, an increase in volume of the center frame 20 to reduce a volume of the upper and lower plates 30 and 10 causes protection of the center frame 20 by the upper and lower plates 30 and 10 to be deteriorated, therefore, a volume of the center frame 20 is preferably 60% or less based on the combined volume.

The prior art substantially fails to consider such conditions and filler as described above. The filler such as calcium carbonate, barium sulfate, lead sulfate, zinc oxide or the like disclosed in the prior art completely fails to concurrently meet all requirements on vibration-proofness, productivity and reliability.

The filler suitable for practicing of the present invention is a powder of an element or compound of 7 or more in specific gravity. Also, the element or compound used as the filler in the disc cartridge of the present invention is not permitted to exhibit any radiation and toxicity because the disc cartridge is used in daily living. Also, in order that the filler exhibits increased reliability in operation in spite of a long period of storage time, it preferably has good resistance to corrosion. Materials for the filler which meet such conditions and are commercially readily available include a stainless steel powder and a tungsten powder.

Is The filler preferably has an average particle diameter of from 1 to 20 μm and a maximum particle diameter of 50 μm or less. An average particle diameter above 20 μm increases abrasion of a molding die and that below 1 μm deteriorates dispersion of the filler in the resin, leading to abrasion of the die and clogging of gates.

Also, a surface treatment of the filler with a lubricant or a silane or titanium coupling agent permits an improvement in conformability of the filler to the resin, to thereby prevent a deterioration in physical properties of the composite resin material such as impact strength or the like due to addition of the filler thereto and increase fluidity of the composite resin material.

The resin used in the present invention is not limited to any specific resin so long as it meets the requirements described above. For example, resin which is conventionally used for injection molding may be used in the present invention.

The invention will be understood more readily with reference to the following example; however, the example is intended to illustrate the invention and are not to be construed to limit the scope of the invention.

EXAMPLE

In the example, the disc cartridge of the present invention for an MD or a magneto-optical disc was manufactured. The disc cartridge was constructed in such a manner as shown in FIG. 3.

Also, for comparison, a conventional disc cartridge constructed in such a manner as shown in FIG. 1 was manufactured. The conventional disc cartridge required to increase fluidity of the resin in order to ensure satisfactory configurational and dimensional accuracy, because it has such a complicated and fine structure as shown in FIG. 1. In order to make the disc cartridge of a composite resin material, it was required that the composite resin compound contains the filler in an amount of 20 parts by volume based on 100 parts by volume of the resin.

The MD disc cartridges of the present invention and comparative samples were made of materials shown in Table 1 under conditions shown therein, wherein:

| | |
|---|---|
| Sample number (SN): | Number with asterisk (*) indicating a comparative sample |
| Upper and lower plates: | |
| Resin: | polycarbonate (specific gravity = 1.2) |
| Weight: | 10 g |
| Volume: | 8.3 cm³ |
| Center frame: | |
| Volume: | shown in Table 1 |
| Resin: | Polystyrene (PS) (specific gravity = 1.05) |
| Filler (F): | |
| W: | Tungsten powder (specific gravity = 19.3) |
| SUS: | Stainless steel powder (specific gravity = 7.9) |
| BS: | Barium sulfate powder (specific gravity = 4.5) |
| Cu: | Copper powder (specific gravity = 9.0) |
| Fe: | Iron powder (specific gravity = 7.9) |
| None: | No filler |
| Filler loadings (FL): | Parts by volume of filler based on 100 parts by volume of resin |
| Specific gravity of composite resin material (SG) = (PS weight + F weight)/(PS volume + F volume) | |
| Moldability (M): | |
| ○: | Good |
| X: | Bad |
| Volume (V): | cm³ |
| Plate volume (PV): | cm³ |
| Disc cartridge characteristics (DCC): | |
| Vibration-proofness (VP): | The cartridge fixed at one end thereof was irradiated with sound waves of 60 Hz from a speaker spaced by 1 cm from |

-continued

Figure 15:
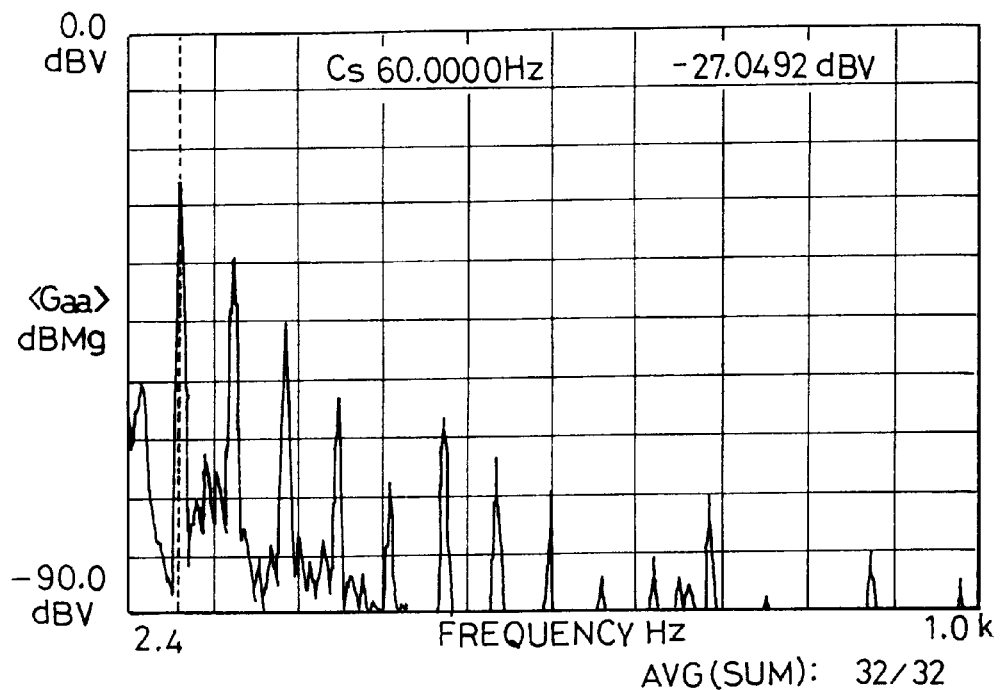
FIG. 15 is a graphical representation showing vibration characteristics of a disc cartridge prepared in an example of the present invention.
Figure 16:
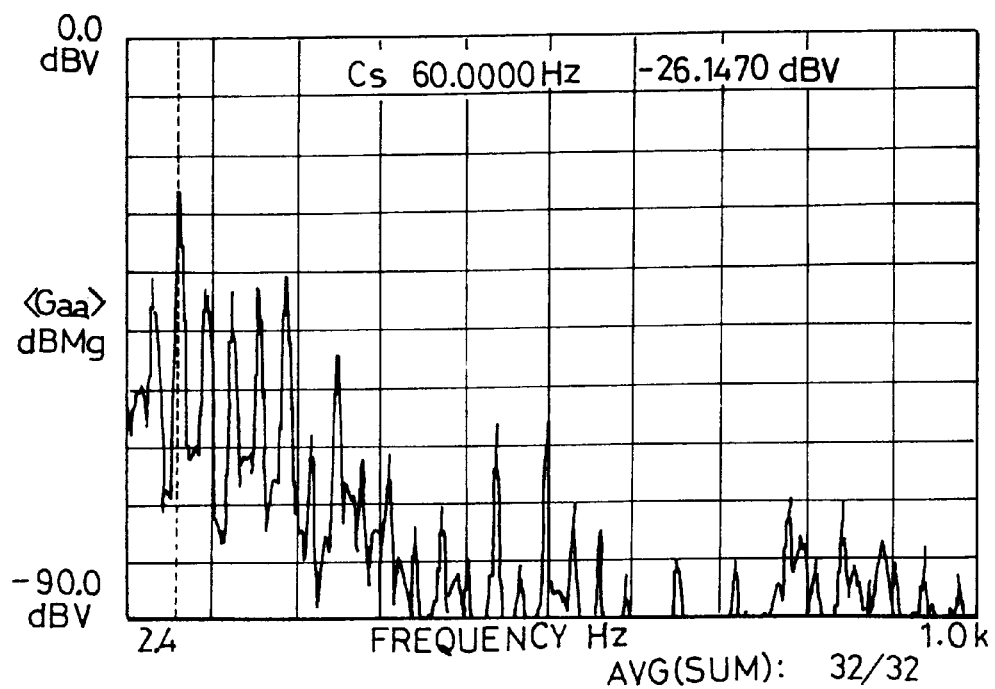
FIG. 16 is a graphical representation showing vibration characteristics of a disc cartridge prepared in a comparative example.

|  |  |
|---|---|
| | the cartridge, to thereby measure vibration on a surface of the cartridge opposite to a surface thereof facing the speaker. |
| ◯: | Good (Sample 3 of the present invention as shown in FIG. 15) |
| Δ: | Somewhat bad |
| X: | Bad (Sample 22 for comparison as shown in FIG. 16) |
| Resin strength (RS): | 1 m drop test |
| ◯: | No crack |
| X: | Occurrence of crack |
| Corrosion resistance (CR): | Spray test of 5% brine according to JIS-Z2371 (48 hours) |
| ◯: | No rust |
| X: | Occurrence of rust |
| Center frame volume proportion (CFV): | % |

TABLE 1

| | CF | | | | | | DCC | | | |
|---|---|---|---|---|---|---|---|---|---|---|
| SN | F | FL | SG | M | V | PV | VP | RS | CR | CFV |
| 1* | W | 5 | 1.9 | ◯ | 2.3 | 8.3 | X | ◯ | ◯ | 28 |
| 2 | W | 8.5 | 2.5 | ◯ | 2.3 | 8.3 | ◯ | ◯ | ◯ | 28 |
| 3 | W | 10 | 2.7 | ◯ | 2.3 | 8.3 | ◯ | ◯ | ◯ | 28 |
| 4 | W | 15 | 3.4 | ◯ | 2.3 | 8.3 | ◯ | ◯ | ◯ | 28 |
| 5* | W | 10 | 2.7 | ◯ | 1.5 | 8.3 | Δ | ◯ | ◯ | 18 |
| 6 | W | 10 | 2.7 | ◯ | 1.7 | 8.3 | ◯ | ◯ | ◯ | 20 |
| 7 | W | 10 | 2.7 | ◯ | 2.0 | 8.3 | ◯ | ◯ | ◯ | 24 |
| 8 | W | 10 | 2.7 | ◯ | 2.6 | 8.3 | ◯ | ◯ | ◯ | 31 |
| 9 | W | 10 | 2.7 | ◯ | 4.0 | 8.3 | ◯ | ◯ | ◯ | 48 |
| 10 | W | 40 | 6.3 | ◯ | 2.3 | 8.3 | ◯ | ◯ | ◯ | 28 |
| 11 | W | 50 | 7.1 | ◯ | 2.3 | 8.3 | ◯ | ◯ | ◯ | 28 |
| 12* | W | 55 | 7.5 | X | 2.3 | 8.3 | ◯ | X | ◯ | 28 |
| 13* | SUS | 25 | 2.4 | ◯ | 2.3 | 8.3 | Δ | ◯ | ◯ | 28 |
| 14 | SUS | 30 | 2.6 | ◯ | 2.3 | 8.3 | ◯ | ◯ | ◯ | 28 |
| 15 | SUS | 45 | 3.2 | ◯ | 2.3 | 8.3 | ◯ | ◯ | ◯ | 28 |
| 16 | SUS | 50 | 3.3 | ◯ | 2.3 | 8.3 | ◯ | ◯ | ◯ | 28 |
| 17* | SUS | 55 | 3.5 | X | 2.3 | 8.3 | ◯ | X | ◯ | 28 |
| 18* | BS | 50 | 2.2 | ◯ | 2.3 | 8.3 | Δ | ◯ | ◯ | 28 |
| 19* | BS | 55 | 2.3 | X | 2.3 | 8.3 | Δ | X | ◯ | 28 |
| 20* | Fe | 45 | 3.2 | ◯ | 2.3 | 8.3 | ◯ | ◯ | X | 28 |
| 21* | Cu | 45 | 3.5 | ◯ | 2.3 | 8.3 | ◯ | ◯ | X | 28 |
| 22* | None | — | 1.05 | ◯ | — | — | X | ◯ | ◯ | — |

While a preferred embodiment of the invention has been described with a certain degree of particularity with reference to the accompanying drawings, obvious modifications and variations are possible in light of the above teachings. It is therefore to be understood that within the scope of the appended claims, the invention may be practiced otherwise than as specifically described.

What is claimed is:

1. A disc cartridge comprising:
   an upper plate having an inner side;
   a lower plate having an inner side facing said inner side of said upper plate;
   a center frame arranged between said inner sides of said upper plate and said lower plate so as to join said upper plate and lower plate to each other therethrough using fixing means; and
   a disc-shaped medium received in said center frame;
   said center frame being constituted by a member having a substantially square shape as viewed in plan, said center frame having a side surface and an inner peripheral surface which is formed so as to continuously surround said disc-shaped medium;
   said upper and lower plates being provided on four corners thereof with fixing bosses through which said upper and lower plates are joined to said center frame, respectively, said fixing bosses of said upper plate and those of said lower plate being arranged in a manner to be opposite to each other, said fixing bosses of said upper plate projecting from said inner side of said upper plate and said fixing bosses of said lower plate projecting from said inner side of said lower plate;
   said upper plate, said lower plate, and said center frame having substantially the same size when viewed in plan so that side surfaces of said upper plate, said lower plate and said center frame form a side surface of the disc cartridge;
   said center frame being formed on opposite surfaces thereof with fitting recesses in which said bosses are fitted, respectively;
   said center frame being formed on each of four corners thereof with a thin-wall portion having a reduced thickness of 50 to 80% based on a whole thickness of said center frame.

2. A disc cartridge as defined in claim 1, wherein said center frame is partly recessed in a surface thereof opposite to said lower plate to provide said thin-wall portions.

3. A disc cartridge as defined in claim 2, wherein said thin-wall portions are each arranged in a region of said center frame between an outer peripheral portion of a respective one of the four corners of said center frame and an inner peripheral portion thereof so that said outer and inner peripheral portions have said whole thickness.

4. A disc cartridge as defined in claim 2, wherein at least one of said upper and lower plates is provided thereon with projections in a manner to be opposite to said thin-wall portions of said center plate, to thereby enhance rigidity of the disc cartridge.

5. A disc cartridge as defined in claim 2, wherein said center frame has a circular receiving space defined therein in which said disc-shaped medium is received and having an inner peripheral surface defining said circular receiving space;
   said center frame has gate positions for molding thereof defined in said inner peripheral surface thereof; and
   said gate positions are each defined so as to be angularly deviated from an intersection between said inner peripheral surface of said center frame and a line defined by connecting a center of said receiving space and a respective one of said corners of said center frame to each other.

6. A disc cartridge as defined in claim 1, wherein said thin-wall portions are each arranged in a region of said center frame between an outer peripheral portion of a respective one of the four corners of said center frame and an inner peripheral portion thereof so that said outer and inner peripheral portions have said whole thickness.

7. A disc cartridge as defined in claim 6, wherein at least one of said upper and lower plates is provided thereon with projections in a manner to be opposite to said thin-wall portions of said center plate, to thereby enhance rigidity of the disc cartridge.

8. A disc cartridge as defined in claim 6, wherein said center frame has a circular receiving space defined therein in which said disc-shaped medium is received and having an inner peripheral surface defining said circular receiving space;
   said center frame has gate positions for molding thereof defined in said inner peripheral surface thereof; and
   said gate positions are each defined so as to be angularly deviated from an intersection between said inner peripheral surface of said center frame and a line defined by connecting a center of said receiving space and a respective one of said corners of said center frame to each other.

9. A disc cartridge as defined in claim 1, wherein said upper and lower plates and said center plate are integrally joined together by means of screws threadedly inserted in said bosses and fitting recesses.

10. A disc cartridge as defined in claim 1, wherein said upper and lower plates and said center plate are integrally joined together by bonding said bosses to said fitting recesses by welding.

11. A disc cartridge as defined in claim 1, wherein at least one of said upper and lower plates is provided thereon with projections in a manner to be opposite to said thin-wall portions of said center plate, to thereby enhance rigidity of the disc cartridge.

12. A disc cartridge as defined in claim 1, wherein said center frame has a circular receiving space defined therein in which said disc-shaped medium is received and having an inner peripheral surface defining said circular receiving space;
said center frame has gate positions for molding thereof defined in said inner peripheral surface thereof; and
said gate positions are each defined so as to be angularly deviated from an intersection between said inner peripheral surface of said center frame and a line defined by connecting a center of said receiving space and a respective one of said corners of said center frame to each other.

13. A disc cartridge as defined in claim 12, wherein said gate positions are defined in respective recesses formed in said inner peripheral surface of said center frame.

14. A disc cartridge as defined in claim 12, wherein said center frame is made of a composite resin material prepared by mixing resin selected from the group consisting of acrylonitrile-butadiene-styrene resin, polycarbonate resin, polystyrene resin and polyamide resin with a metal powder.

15. A disc cartridge as defined in claim 12, wherein said center frame is made of a composite resin material of 2.5 or more in specific gravity prepared by mixing resin with a filler.

16. A disc cartridge as defined in claim 1, wherein said center frame is made of a composite resin material prepared by mixing resin selected from the group consisting of acrylonitrile-butadiene-styrene resin, polycarbonate resin, polystyrene resin and polyamide resin with a metal powder.

17. A disc cartridge as defined in claim 1, wherein said center frame is made of a composite resin material of 2.5 or more in specific gravity prepared by mixing resin with a filler.

18. A disc cartridge as defined in claim 17, wherein said center frame is formed with a volume of 20 to 60% based on a combined volume of said upper and lower plates.

19. A disc cartridge as defined in claim 18, wherein the filler contained in said composite resin material is an amount of 50 parts by volume or less based on 100 parts by volume of the resin.

20. A disc cartridge as defined in claim 18, wherein said filler comprises a metal powder selected from the group consisting of a tungsten powder and a stainless steel powder.

21. A disc cartridge as defined in claim 17, wherein the filler contained in said composite resin material is an amount of 50 parts by volume or less based on 100 parts by volume of the resin.

22. A disc cartridge as defined in claim 21, wherein said filler comprises a metal powder selected from the group consisting of a tungsten powder and a stainless steel powder.

23. A disc cartridge as defined in claim 17, wherein said filler comprises a metal powder selected from the group consisting of a tungsten powder and a stainless steel powder.

24. A disc cartridge comprising:
an upper plate;
a lower plate;
a center frame arranged between said upper plate and said lower plate so as to join said upper plate and lower plate to each other therethrough using fixing means; and
a disc-shaped medium received in said center frame;
said center frame being constituted by a circumferential member having a substantially square shape as viewed in plan which is formed so as to continuously surround said disc-shaped medium;
said upper and lower plates being provided on four corners thereof with fixing bosses through which said upper and lower plates are joined to said center frame, respectively, said fixing bosses of said upper plate and those of said lower plate being arranged in a manner to be opposite to each other;
said center frame being formed on opposite surfaces thereof with fitting recesses in which said bosses are fitted, respectively;
said center frame being formed on each of four corners thereof with a thin-wall portion having a reduced thickness of 50 to 80% based on a whole thickness of said center frame, and
an erasure preventing plug;
said center frame being provided in an outer surface thereof with a cutout in which said erasure preventing plug is arranged;
the corner of said center frame in proximity to said cutout being so arranged that a distal end thereof is positioned inside an outer edge of said upper and lower plates.

25. A disc cartridge comprising:
an upper plate;
a lower plate;
a center frame arranged between said upper plate and said lower plate so as to join said upper plate and lower plate to each other therethrough using fixing means; and
a disc-shaped medium received in said center frame;
said center frame being constituted by a circumferential member having a substantially square shape as viewed in plan which is formed so as to continuously surround said disc-shaped medium;
said upper and lower plates being provided on four corners thereof with fixing bosses through which said upper and lower plates are joined to said center frame, respectively, said fixing bosses of said upper plate and those of said lower plate being arranged in a manner to be opposite to each other;
said center frame being formed on opposite surfaces thereof with fitting recesses in which said bosses are fitted, respectively;
said center frame being formed on each of four corners thereof with a thin-wall portion having a reduced thickness of 50 to 80% based on a whole thickness of said center frame,
wherein said center frame is partly recessed in a surface thereof opposite to said lower plate to provide said thin-wall portions, and
an erasure preventing plug;
said center frame being provided in an outer surface thereof with a cutout in which said erasure preventing plug is arranged;

the corner of said center frame in proximity to said cutout being so arranged that a distal end thereof is positioned inside an outer edge of said upper and lower plates.

26. A disc cartridge comprising:

an upper plate;

a lower plate;

a center frame arranged between said upper plate and said lower plate so as to join said upper plate and lower plate to each other therethrough using fixing means; and a disc-shaped medium received in said center frame;

said center frame being constituted by a circumferential member having a substantially square shape as viewed in plan which is formed so as to continuously surround said disc-shaped medium;

said upper and lower plates being provided on four corners thereof with fixing bosses through which said upper and lower plates are joined to said center frame, respectively, said fixing bosses of said upper plate and those of said lower plate being arranged in a manner to be opposite to each other;

said center frame being formed on opposite surfaces thereof with fitting recesses in which said bosses are fitted, respectively;

said center frame being formed on each of four corners thereof with a thin-wall portion having a reduced thickness of 50 to 80% based on a whole thickness of said center frame wherein said thin-wall portions are each arranged in a region of said center frame between an outer peripheral portion of a respective one of the four corners of said center frame and an inner peripheral portion thereof so that said outer and inner peripheral portions have said whole thickness, and an erasure preventing plug;

said center frame being provided in an outer surface thereof with a cutout in which said erasure preventing plug is arranged;

the corner of said center frame in proximity to said cutout being so arranged that a distal end thereof is positioned inside an outer edge of said upper and lower plates.

27. A disc cartridge comprising:

an upper plate;

a lower plate;

a center frame arranged between said upper plate and said lower plate so as to join said upper plate and lower plate to each other therethrough using fixing means; and a disc-shaped medium received in said center frame;

said center frame being constituted by a circumferential member having a substantially square shape as viewed in plan which is formed so as to continuously surround said disc-shaped medium;

said upper and lower plates being provided on four corners thereof with fixing bosses through which said upper and lower plates are joined to said center frame, respectively, said fixing bosses of said upper plate and those of said lower plate being arranged in a manner to be opposite to each other;

said center frame being formed on opposite surfaces thereof with fitting recesses in which said bosses are fitted, respectively;

said center frame being formed on each of four corners thereof with a thin-wall portion having a reduced thickness of 50 to 80% based on a whole thickness of said center frame, wherein said center frame is partly recessed in a surface thereof opposite to said lower plate to provide said thin-wall portions, and wherein said thin-wall portions are each arranged in a region of said center frame between an outer peripheral portion of a respective one of the four corners of said center frame and an inner peripheral portion thereof so that said outer and inner peripheral portions have said whole thickness, and an erasure preventing plug;

said center frame being provided in an outer surface thereof with a cutout in which said erasure preventing plug is arranged;

the corner of said center frame in proximity to said cutout being so arranged that a distal end thereof is positioned inside an outer edge of said upper and lower plates.

* * * * *

UNITED STATES PATENT AND TRADEMARK OFFICE
CERTIFICATE OF CORRECTION

PATENT NO. : 6,108,298
DATED : August 22, 2000
INVENTOR(S) : Miyazaki, et al.

It is certified that error appears in the above-identified patent and that said Letters Patent is hereby corrected as shown below:

Column 1,
Line 51, delete "of".

Column 2,
Line 1, "mount" should read --amount--.
Line 29, "is" should read --are--.

Column 3,
Line 38, "to reduce" should read --a reduction of--.

Column 4,
Line 11, "It would be considered to form" should read --One could form--.

Column 6,
Line 46, "frame" should read --frame 20--.
Line 54, "to predetermine" should read --to a predetermined--.

Column 8,
Line 14, "fame" should read --frame--.
Line 17, "joining" should read --join--.
Line 17, "coupling" should read --couple--.

UNITED STATES PATENT AND TRADEMARK OFFICE
CERTIFICATE OF CORRECTION

PATENT NO. : 6,108,298
DATED : August 22, 2000
INVENTOR(S) : Miyazaki, et al.

It is certified that error appears in the above-identified patent and that said Letters Patent is hereby corrected as shown below:

Column 9,
Line 3, "have" should read --has--.
Line 47, "hight" should read --height--.

Column 10,
Line 24, "17," should read --$17_1$--.
Line 24, "172" should read --$17_2$--.

Column 11,
Line 31, delete "to".
Line 34, delete "to".

Column 13,
Line 59, delete "Is".

Column 14,
Line 3, "increase" should read --increased--.
Line 12, "are" should read --is--.

Column 20,
Line 29, delete "and".

Signed and Sealed this

Seventh Day of August, 2001

*Attest:*

Nicholas P. Godici

NICHOLAS P. GODICI
*Attesting Officer*   *Acting Director of the United States Patent and Trademark Office*